United States Patent [19]
Murphy

[11] Patent Number: 5,951,122
[45] Date of Patent: Sep. 14, 1999

[54] ANTISKID CONTROL AND WHEEL LOCK PROTECTION DIFFERENTIAL REFERENCE CONTROLLER

[75] Inventor: John T. Murphy, Middlebury, Vt.

[73] Assignee: The B.F. Goodrich Company, Richfield, Ohio

[21] Appl. No.: 09/001,571

[22] Filed: Dec. 31, 1997

[51] Int. Cl.$^6$ ................................................ B60T 8/32
[52] U.S. Cl. ................ 303/163; 188/181 C; 303/121; 303/182; 701/71
[58] Field of Search ............................... 303/163, 147, 303/165, 175, 167, 150, 182, DIG. 4, 121, 168, 171, 126, 173; 188/181 C; 180/197; 364/149, 164; 701/71, 79, 72, 75, 74, 70, 78, 76, 80; 702/147, 148, 196, 142, 189, 190; 706/905

[56] References Cited

U.S. PATENT DOCUMENTS

| | | |
|---|---|---|
| 3,586,387 | 6/1971 | Riordan et al. ............................ 303/182 |
| 3,614,172 | 10/1971 | Riordan .................................... 303/182 |
| 4,679,866 | 7/1987 | van Zanten et al. . |
| 4,715,662 | 12/1987 | van Zanten et al. . |
| 4,764,871 | 8/1988 | van Zanten . |
| 5,050,940 | 9/1991 | Bedford et al. . |
| 5,180,214 | 1/1993 | Yeh et al. . |
| 5,371,677 | 12/1994 | Ehret et al. . |
| 5,424,942 | 6/1995 | Dong et al. . |
| 5,454,630 | 10/1995 | Zhang . |
| 5,487,594 | 1/1996 | Schneider ................................. 303/155 |

OTHER PUBLICATIONS

Mark L. Akey, "Fuzzy Logic, Anti–Skid Control for Commercial Trucks"; Magnavox Decision Support Systems Applied Center of Excellence, Fort Wayne, Indiana, SPIE vol. 2493, Mar. 1995, pp. 359–370.

Hutchinson, et al., "Applications of Minimum Variance Reduced–State Estimators", IEEE Transactions on Aerospace and Electronic Systems; Sep. 1975; pp. 785–794.

du Plessis, "Poor Man's Explanation of Kalman Filtering" Autonetics Division, Rockwell International; date unknown.

Kobayashi, et al., Estimation of Absolute Vehicle Speed Using Fuzzy Logic Rule–Based Kalman Filter Proceedings of the American Control Conference; Jun. 1995.

*Primary Examiner*—Douglas C. Butler
*Attorney, Agent, or Firm*—Richard A. Romanchik; Mark D. Saralino

[57] ABSTRACT

A brake control system which employs an antiskid control and wheel lock protection differential reference controller to provide antiskid and antilock brake control. The differential reference controller is capable of estimating both wheel velocity and vehicle velocity based on a single wheel speed sensor input. To reduce the effects of wheel speed noise, the differential reference controller estimates the wheel velocity and vehicle velocity by carrying out parallel processes using identical processing functions. The estimated wheel velocity and vehicle velocity are subtracted providing a differential output indicative of the slip velocity. Only unique parameters for each process, derived from physical constants, are different. In this way, the wheel speed noise is introduced into both processes and canceled when the results are subtracted to obtain the slip velocity.

22 Claims, 6 Drawing Sheets

WHEEL SPEED ESTIMATION

Fig. 5

VEHICLE SPEED ESTIMATION

Fig. 6

Fig. 7 though the wheel and road surface occurs when the wheel is permitted to travel at a rotational velocity that is somewhat less than the relative velocity of the vehicle to the road surface. The difference between the wheel velocity and vehicle velocity is commonly referred to as the slip velocity. The slip ratio is a parameter that is derived by dividing the slip velocity by the vehicle velocity.

ANTISKID CONTROL AND WHEEL LOCK PROTECTION DIFFERENTIAL REFERENCE CONTROLLER

TECHNICAL FIELD

The present invention relates generally to antiskid and antilock brake control, and more particularly to an apparatus and method for providing antiskid/antilock brake control for a vehicle (e.g., automobile, aircraft, etc.).

BACKGROUND OF THE INVENTION

Various studies of tire to surface friction and analysis of empirical data has shown that the maximum friction between a wheel and road surface occurs when the wheel is permitted to travel at a rotational velocity that is somewhat less than the relative velocity of the vehicle to the road surface. The difference between the wheel velocity and vehicle velocity is commonly referred to as the slip velocity. The slip ratio is a parameter that is derived by dividing the slip velocity by the vehicle velocity.

Antiskid and antilock brake control systems have been in widespread use for many years. In the simplest sense, an antiskid brake control system compares the speed of a vehicle derived from a wheel speed sensor (and wheel radius) to the vehicle speed typically derived from a secondary or reference source. If the wheel is determined to be skidding an excessive amount, then brake pressure applied to the wheel is released and the wheel is allowed to spin back up to the appropriate speed.

Figure 1:
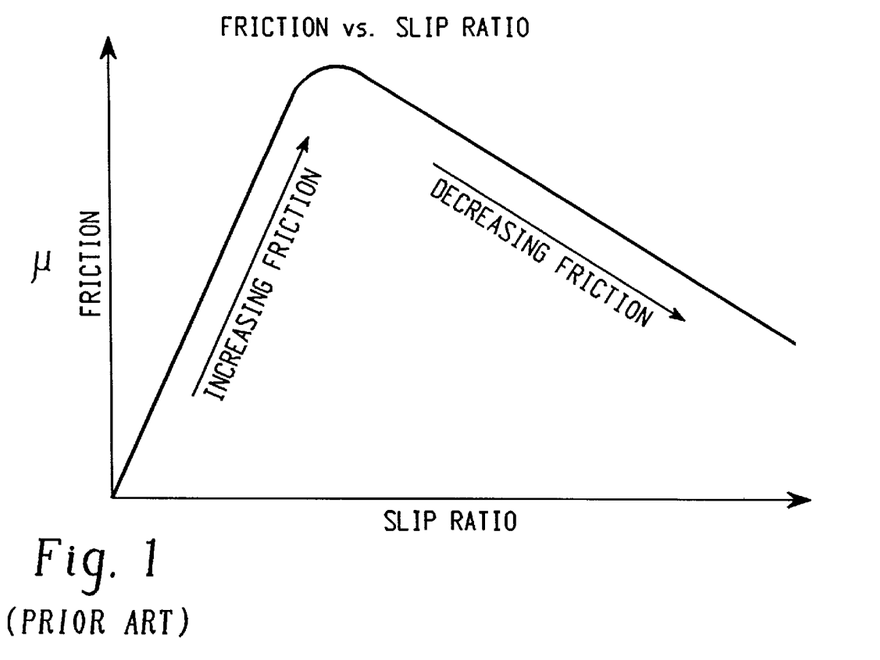
FIG. 1 is a typical mu-slip curve as is known in the art.

There are, of course, two major problems that become apparent in any such antiskid system. The first relates to determining the appropriate amount of skidding. The second relates to determining from where to obtain the reference velocity. The appropriate amount of skidding is described by the much discussed but seldom measured mu-slip curve. As is shown in FIG. 1, typically such curve is represented by the coefficient of friction $\mu$ between the wheel and the running surface on a vertical axis and the slip ratio on the horizontal axis. A slip ratio of zero is when the wheel is not skidding while a slip ratio equal to one represents a fully locked wheel.

In general, the slip ratio is increased by increasing the brake pressure in a braking system. It should be observed, however, that friction increases rapidly to a maximum, then begins to decrease with increasing slip ratio. This creates a control reversal problem as part of antiskid/antilock brake control when attempting to maintain maximum friction and provide optimal vehicular stopping distance. Furthermore, it has been found that lateral vehicle control is inversely proportional to the slip ratio. Consequently, it is preferable to maintain braking control at a location on the mu-slip curve which is slightly less than its peak. In order to avoid excessive wear on the wheel, typically the desired operating location on the mu-slip curve is slightly to the left of the peak of the mu-slip curve.

A problem that is often encountered when attempting to compute the slip velocity, and hence determining the appropriate amount of skidding, is excessive noise which is encountered on the wheel speed measurement. Such noise is caused, for example, by quantization effects from the wheel speed sensor, changes in the diameter of the wheel (both dynamic and wear related), or the movement of mechanical components attached to the wheel and speed sensor.

Regarding obtaining the vehicle/reference velocity in order to compute the slip ratio, it is often times necessary to rely on various accelerometers and other sensors to provide an accurate estimate of the reference velocity. This adds to the computational burden imposed on the brake control circuitry. Moreover, the cost associated with providing accurate and reliable sensors quickly adds up.

In view of the aforementioned shortcomings associated with existing antiskid/antilock brake control systems, there is a strong need in the art for a system which is substantially less susceptible to noise that may be encountered on the wheel speed measurement. In addition, there is a strong need for a system which does not require multiple sensors and which is able to operate based only on a single sensor that measures wheel speed. Moreover, there is a strong need for a system which does not place a large computational burden on the brake control system processor.

SUMMARY OF THE INVENTION

The brake control system of the present invention employs what is referred to as an antiskid control and wheel lock protection differential reference controller to provide antiskid and antilock brake control. The differential reference controller is capable of estimating both wheel velocity and vehicle velocity based on a single wheel speed sensor input.

In order to greatly reduce the effects of wheel speed noise, the differential reference controller estimates the wheel velocity and vehicle velocity by carrying out parallel processes using identical processing functions. The estimated wheel velocity and vehicle velocity are subtracted providing a differential output indicative of the slip velocity. Only unique parameters for each process, derived from physical constants, are different. In this way, the wheel speed noise is introduced into both processes and canceled when the results are subtracted to obtain the slip velocity.

In addition to requiring only a single wheel speed sensor, the present invention avoids placing a large computational burden on the processor or processors controlling the brake system. The identical processing functions that are carried out based on as few as one input sensor allows computations to be carried out at high speed and with only a small number of operations.

The exemplary embodiment employs both a fast integrator and a slow integrator for maintaining a desired slip velocity or operating point on the mu-slip curve. The fast integrator is designed to have a gain and a slew rate that is faster than the response of the brake actuator assembly. The slow integrator is generally set to a gain and slew rate limit that is slower than the response of the brake actuator. While operating on dry surfaces, only the slow integrator will be active typically. If the braking surface has a low coefficient of friction, however, the fast integrator will begin to add to a composite output. The use of two integrators that bound the performance of the brake actuator makes the controller less sensitive to varying actuator characteristics. In the event of an impending wheel skid, a skid protection loop momentarily releases the brake, resets the system, and gradually reapplies the brake.

In accordance with a first aspect of the invention, a system for controlling a braking force applied to a wheel of a vehicle is provided. The system includes a brake controller having an input for receiving a brake force command indicative of a desired amount of brake force to be applied to the wheel, and an output for providing a brake force output command to a brake actuator and assembly which applies a brake force to the wheel based on the brake force output command; a wheel speed sensor, operatively coupled to the wheel, for measuring a speed of the wheel and providing an output signal indicative of the measured wheel speed; and a differential reference controller, comprising: means for estimating the wheel speed based on the output signal of the wheel speed sensor; means for estimating the vehicle speed based on the output signal of the wheel speed sensor; means for calculating a difference between the estimated vehicle speed and the estimated wheel speed to obtain an estimated slip velocity; and means for adjusting the brake force applied to the wheel by the brake controller based on the estimated slip velocity.

In accordance with another aspect of the invention, a differential reference controller for controlling braking operation of a wheel of a vehicle based on an output signal provided by a wheel speed sensor coupled to the wheel is provided. The controller includes means for estimating the wheel speed based on the output signal of the wheel speed sensor; means for estimating the vehicle speed based on the output signal of the wheel speed sensor; means for calculating a difference between the estimated vehicle speed and the estimated wheel speed to obtain an estimated slip velocity; and output means for providing a control signal for adjusting the brake force applied to the wheel based on the estimated slip velocity.

According to still another aspect of the invention, a method for controlling a braking force applied to a wheel of a vehicle is provided. The method comprising the steps of receiving a brake force command indicative of a desired amount of brake force to be applied to the wheel, and providing a brake force output command to a brake actuator and assembly which applies a brake force to the wheel based on the brake force output command; measuring a speed of the wheel and providing an output signal indicative of the measured wheel speed; estimating the wheel speed based on the output signal of the wheel speed sensor; estimating the vehicle speed based on the output signal of the wheel speed sensor; calculating a difference between the estimated vehicle speed and the estimated wheel speed to obtain an estimated slip velocity; and adjusting the brake force applied to the wheel based on the estimated slip velocity.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

The present invention will now be described with reference to the figures in which like reference numerals are used to refer to like elements throughout.

Figure 2:
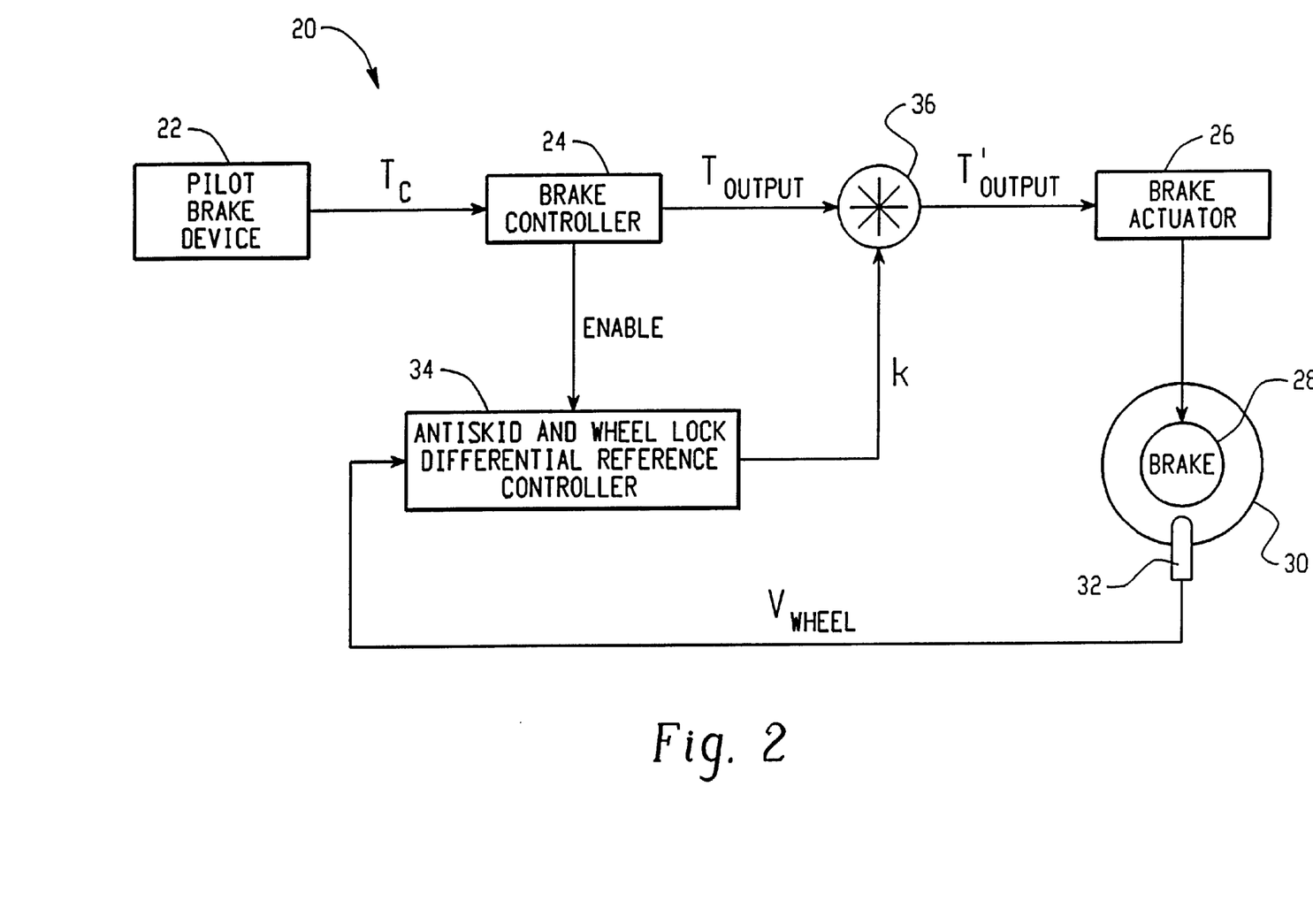
FIG. 2 is a block diagram of a brake control system including an antiskid and wheel lock differential reference controller in accordance with the present invention.

Referring initially to FIG. 2, a brake control system as used in an aircraft in accordance with the present invention is generally designated 20. Brake control on an aircraft is usually structured in a paired wheel configuration for functional modularity. For example, if the aircraft has two wheels on the left side of the aircraft and two wheels on the right side, the outer two wheels form a pair and the inner two wheels form another pair. Within a pair there is a right wheel control and left wheel control. The left and right wheel control functions are uncoupled except for locked wheel protection. The basic unit therefore consists of control of a single wheel which can be left or right. As utilized herein, it will be appreciated that the term "wheel" is intended to refer collectively to both the wheel and tire.

For sake of simplicity, the brake control system 20 as shown in FIG. 2 represents the basic unit for providing brake control of a single wheel (left or right). However, it will be appreciated that control for the other wheel(s) can be provided via corresponding systems 20 or in a single system incorporating the same inventive principles. Moreover, the preferred embodiment of the present invention provides brake control in connection with an aircraft. Nevertheless, it will be appreciated that the brake control system with differential reference antiskid control according to the present invention has utility for virtually any type of vehicle and is not limited necessarily to brake control for aircraft.

The system 20 includes a pilot brake device 22 for providing operator brake control. In addition, the system 20 includes a conventional brake controller 24. The controller 24 is designed to provide a control signal $T_{output}$ to a brake actuator 26 included in the system 20. The brake actuator 26 may be any conventional type actuator (e.g., hydraulic, pneumatic or electromechanical) for applying pressure to the brake material (not shown) in a brake assembly 28. The brake assembly 28 in turn provides braking action to a wheel 30 by exerting a braking torque or force on the wheel 30 as is conventional. The wheel 30 is coupled to the aircraft (or other vehicle) via a conventional structure (not shown).

The system 20 further includes a wheel speed sensor 32 which measures the speed of the wheel 30. The speed of the wheel may be based on the measured angular velocity of the wheel multiplied by its radius to provide linear wheel speed as is known. The wheel speed sensor 32 may be any conventional sensor (e.g., optical encoder based, etc.) which provides an output signal $v_{wheel}$ indicative of the measured speed of the wheel 30.

The signal $v_{wheel}$ is input to an antiskid and wheel lock differential reference controller 34 included in the system 20. As will be discussed in detail below, the controller 34 estimates both the wheel speed and the speed of the vehicle based on the measured wheel speed $v_{wheel}$ from the wheel speed sensor 32. The controller 34 then computes the difference between the estimated wheel speed and vehicle speed to obtain an estimated slip velocity. Based on the estimated slip velocity, the controller 34 provides a composite control signal "k" which varies in value from 0 to 1 depending on the estimated slip velocity. The control signal k is output by the controller 34 to a multiplier 36 which multiplies the brake control signal $T_{output}$ by the value of k. The resultant modified brake control signal $T_{output}'$ is output by the multiplier 36 to the brake actuator 26. The brake actuator 26 consequently applies a braking force to the wheel 30 based on the modified brake control signal $T_{output}'$.

If the estimated slip velocity begins to exceed a predefined desired slip velocity for optimum braking, the output k from the controller 34 will begin to transition from 1 to 0 so as to reduce the amount of braking force applied by the actuator 26. In the event the estimated slip velocity eventually exceeds a predefined maximum slip velocity (e.g., as a result of an ice patch or the like), the output k from the controller 34 goes to zero. This effectively releases the brake force applied by the actuator. The brake force remains at zero momentarily before the controller 34 again estimates the slip velocity in an effort to provide braking at the desired optimum slip velocity.

The controller 34 receives an ENABLE signal from the brake controller 24 so as to activate the controller 34 during a braking event (e.g., activation of the pilot brake device 22). Consequently, the controller 34 may be disabled during non-braking events.

Generally describing the operation of the system 20, the pilot brake device 22 comprises a pedal or equivalent thereof. During a braking event, the pilot of the aircraft activates the pilot brake device 22 by pushing the pedal (or its equivalent). The depression of the pedal is converted to an electrical signal (brake torque command signal $T_c$) which is provided to the controller 24. The value of the command signal $T_c$ is indicative of the degree of depression of the pedal, and is related to the amount of braking force requested by the pilot as is conventional. The controller 24 receives the command signal $T_c$ and outputs the brake control signal $T_{output}$ which is related to the command signal $T_c$. Concurrently, the controller 24 enables the differential controller 34 via the ENABLE signal.

Figure 3:
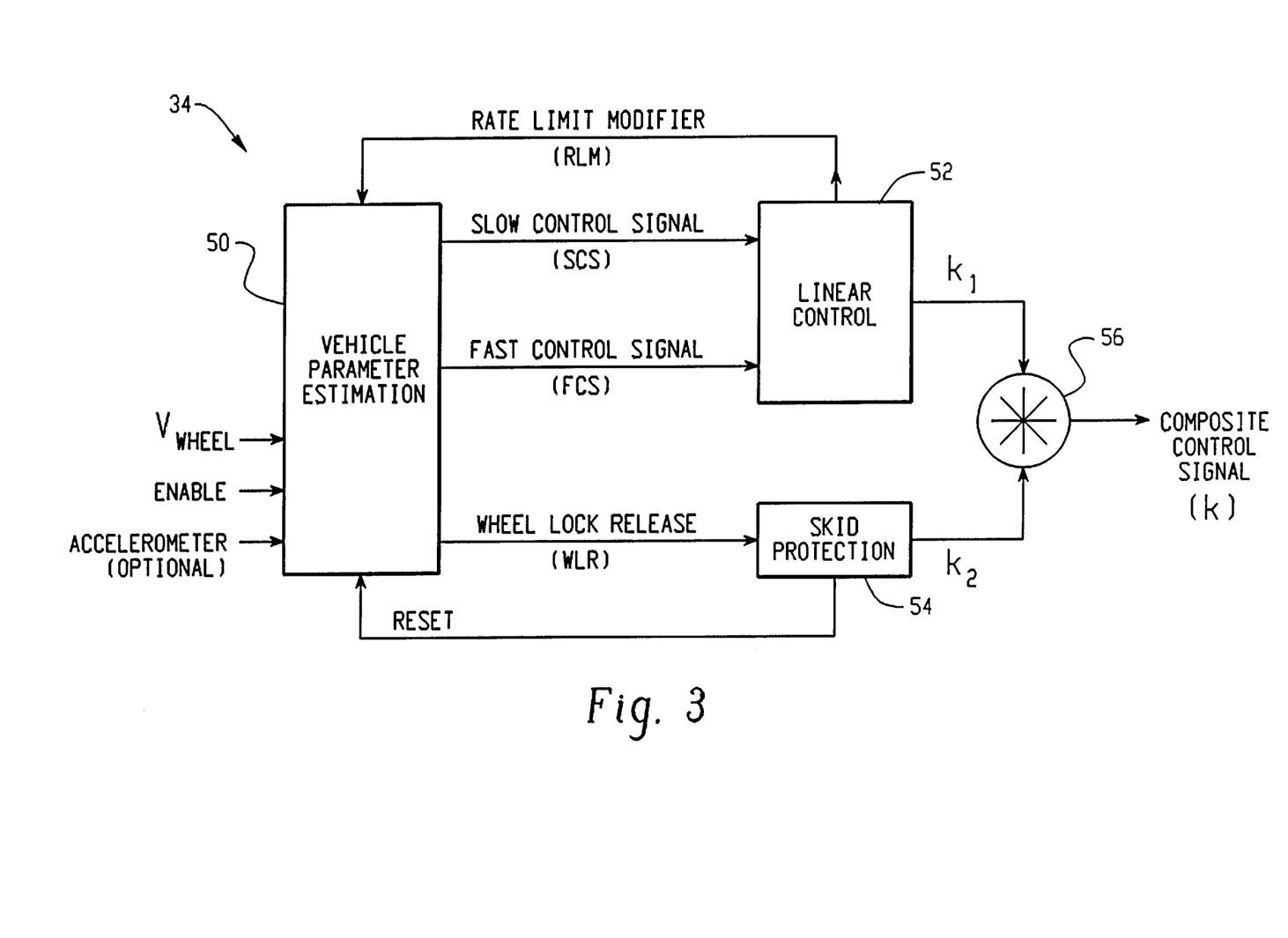
FIG. 3 is a detailed block diagram of the differential reference controller in accordance with the present invention.

FIG. 3 is a detailed block diagram of the differential controller 34 in accordance with the exemplary embodiment of the present invention. The controller 34 includes a vehicle parameter estimation block 50 described in more detail below in connection with FIG. 4. The vehicle parameter estimation block 50 receives as inputs the measured wheel speed signal $v_{wheel}$ provided by the wheel speed sensor 32, and the ENABLE signal from the controller 24 which serves generally to enable the block 50. In addition, the vehicle parameter estimation block 50 receives a rate limit modifier (RLM) signal which is fed back from a linear control block 52 that is also included in the controller 34.

As will be described in more detail below, the vehicle parameter estimation block 50 estimates the wheel speed and vehicle speed based on the output of the wheel speed sensor 32. In turn, the vehicle parameter estimation block 50 computes an estimated slip velocity and establishes three different error signals based on the estimated slip velocity. The error signals include a slow control signal (SCS) and a fast control signal (FCS) which are each output to the linear control block 52. The third error signal, a wheel lock release control signal (WLR), is output to a skid protection block 54 also included in the controller 34. The vehicle parameter estimation block 50 updates and maintains the values of each of the SCS, FCS and WLR signals upon the enable signal being applied and through a braking event. In the event a RESET command is provided to the vehicle parameter estimation block 50 from the skid protection block 54 (i.e., RESET=1 as is discussed in more detail below), the brake assembly 28 is momentarily released, the estimates are recomputed, and the process continues.

The linear control block 52 receives the SCS and FCS error signals and outputs a control signal k1 whose value ranges from 0 to 1. The particular value of k1 depends on how close the estimated slip velocity is to the desired slip velocity for optimum braking, as determined from SCS and FCS. The skid protection block 54 outputs a control signal k2 which is either 0 or 1, depending on whether the estimated slip velocity is beyond a predefined maximum allowable slip velocity as determined based on the WLR signal. Details regarding the operation of the linear control block 52 and the skid protection block 54 are discussed below in relation to FIGS. 7 and 8, respectively. The control signals k1 and k2 are each input into a multiplier 56 which computes the value of the composite control signal k, where k is equal to k1k2.

Figure 4:
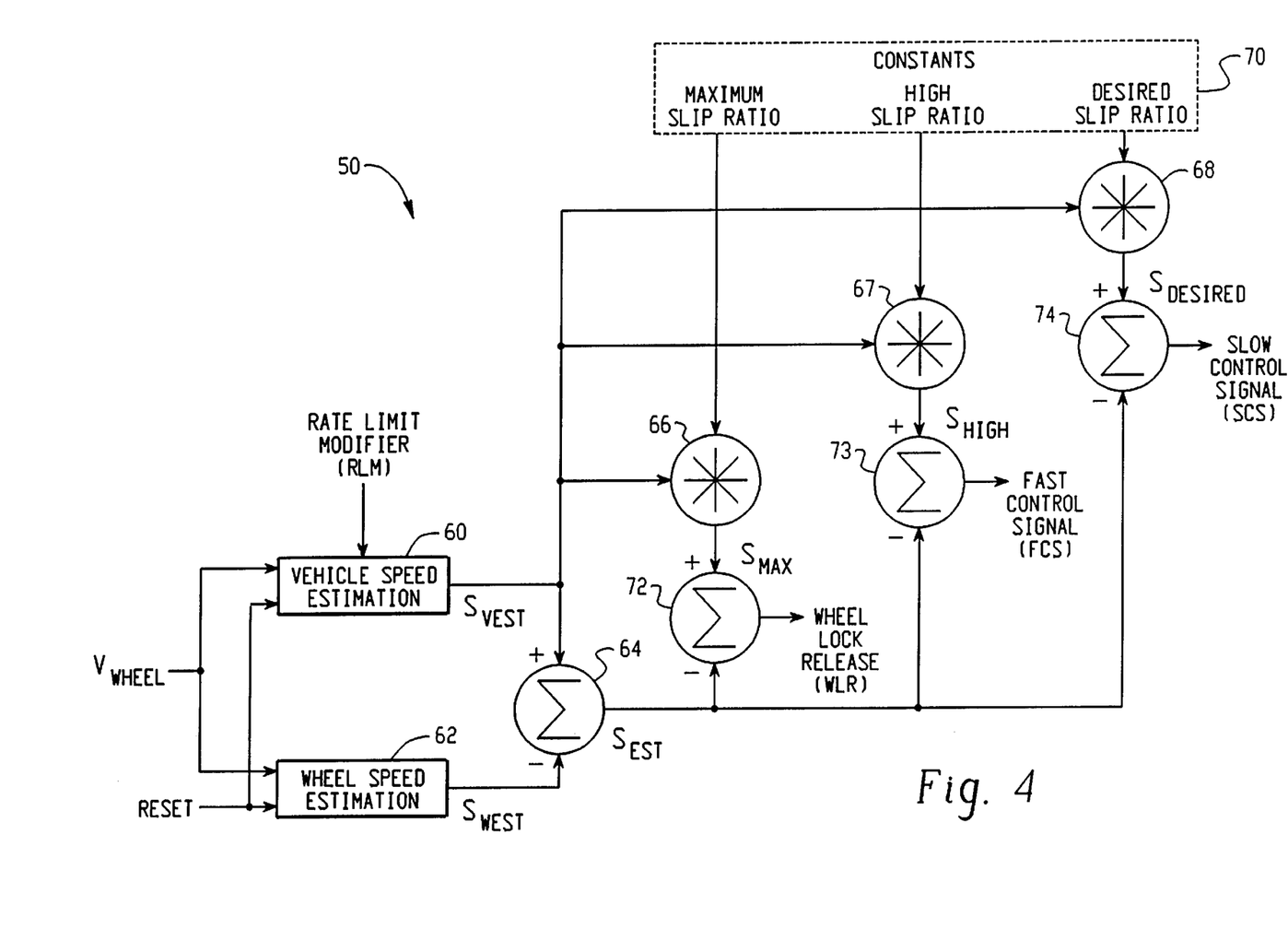
FIG. 4 is a detailed schematic diagram of the vehicle parameter estimation block in accordance with the present invention.

FIG. 4 illustrates in detail the vehicle parameter estimation block 50. The vehicle parameter estimation block 50 includes a vehicle speed estimation block 60 and a wheel speed estimation block 62. As is described in detail below in connection with FIG. 5, the wheel speed estimation block 62 provides as its output an estimated wheel speed $v_{west}$ based on the $v_{wheel}$ signal which is input from the wheel speed sensor 32. The vehicle speed estimation block 60 is discussed below in connection with FIG. 6, and serves to output an estimated speed of the vehicle $v_{vest}$ based on the same $v_{wheel}$ signal. In general, the vehicle speed estimation block 60 employs substantially the same processing functions to the $v_{wheel}$ signal as does the wheel speed estimation block 62. The process functions in the respective blocks 60 and 62 are carried out in parallel. Thus, when an adder 64 adds the negative value of the estimated wheel velocity $v_{west}$ to the estimated vehicle velocity $v_{vest}$ to compute an estimated slip velocity $s_{est}$, wheel speed noises introduced into each of the process functions are canceled.

The estimated vehicle velocity $v_{vest}$ is input to each of multipliers 66, 67 and 68 included in the vehicle parameter estimation block 50. Also included within the block 50 is a register 70 for storing predefined constants associated with the controller 34. More specifically, the register 70 has stored therein constants representing predefined values of a desired slip ratio, a high slip ratio, and a maximum slip ratio, where slip ratio is defined as (vehicle speed—wheel speed)/vehicle speed. In the exemplary embodiment, the desired, high and maximum slip ratio values are typically 0.12, 0.16, and 0.24, respectively. The desired slip ratio represents the slip ratio which is predetermined to provide optimum braking. The high slip ratio represents a predetermined slip ratio at which satisfactory braking is still achievable. The maximum slip ratio represents a predetermined maximum slip ratio that maintains lateral vehicle control.

The maximum, high and desired slip ratio values are input to multipliers 66, 67 and 68, respectively, so as to be multiplied by the estimated vehicle speed $v_{vest}$. Accordingly, the multipliers 66, 67 and 68 respectively output a maximum slip velocity $s_{max}$, high slip velocity $s_{high}$, and desired slip velocity $s_{desired}$, where slip velocity is given by (vehicle speed-wheel speed). The slip velocities $s_{max}$, $s_{high}$ and $s_{desired}$ (where $s_{max}$>$s_{high}$>$s_{desired}$) are respectively input into adders 72, 73 and 74. At the same time, the estimated slip velocity $s_{est}$ output from the adder 64 is provided to a negative input of each of the adders 72–74. The adders 72–74 subtract the estimated slip velocity $s_{est}$ from the respective slip velocities $s_{max}$, $s_{high}$ and $s_{desired}$ in order to output the error signals WLR, FCS and SCS, where:

WLR=$s_{max}$-$s_{est}$

FCS=$s_{high}$-$s_{est}$

SCS=$s_{desired}$-$s_{est}$

As a result, if the estimated slip velocity $s_{est}$ is greater than slip velocity $s_{max}$, WLR will be negative. If the estimated slip velocity $s_{est}$ is less than $s_{max}$, WLR will be positive. Similarly, if the slip velocity $s_{est}$ is greater than $s_{high}$, FCS will be negative; and if $s_{est}$ is less than $s_{high}$ FCS will be positive. Finally, if $s_{est}$ is greater than $s_{desired}$, SCS will be negative; and if $s_{est}$ is less than $s_{desired}$ SCS will be positive.

Figure 5:
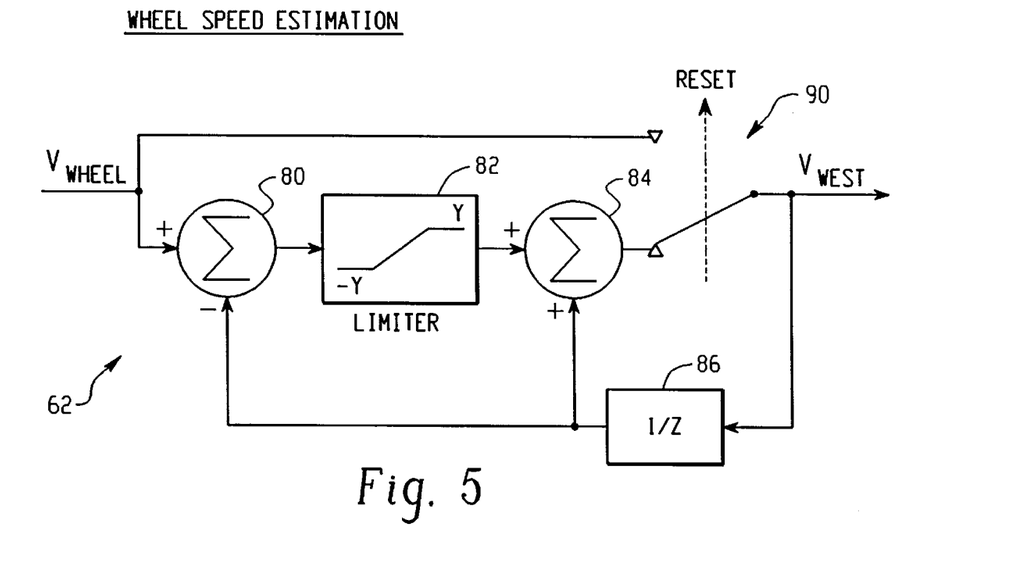
FIG. 5 is a detailed schematic diagram of the wheel speed estimation block in accordance with the present invention.
Figure 6:
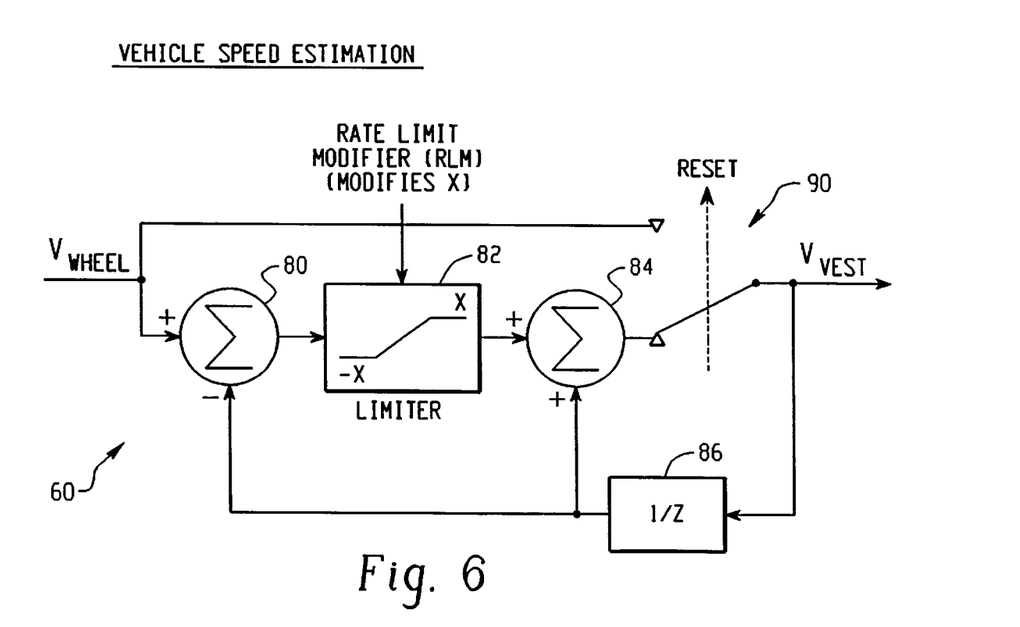
FIG. 6 is a detailed schematic diagram of the vehicle speed estimation block in accordance with the present invention.

Referring briefly to FIGS. 5 and 6, the wheel speed estimation block 62 and vehicle speed estimation block 60 are respectively shown in detail. Each of the blocks 60 and 62 is made up of a rate limiter. As is shown in FIG. 5, the wheel speed estimation block 62 receives the measured wheel speed $v_{wheel}$ as an input. Specifically, the wheel speed $v_{wheel}$ is input to an adder 80. The adder 80 compares the measured wheel speed $v_{wheel}$ with the estimated wheel speed $v_{west}$ from the previous sample period. The difference there between represents an error signal which is output by the adder 80 to a limiter 82. The limiter 82 limits the error signal so as to fall within the range of -Y to Y. Y represents the predetermined maximum rate of change in speed that the wheel can experience during one sample period. Y may be computed based on the wheel and tire mass, and the mass moment of inertia, using known techniques.

The limited error signal output from the limiter 82 is input to an adder 84 which sums the error signal with the value of the estimated wheel velocity $v_{west}$ from the previous sample period to provide the current estimated wheel velocity $v_{west}$. A delay block 86 receives as its input the estimated wheel velocity $v_{west}$ and outputs the previous value to the adders 80 and 84. Consequently, the wheel speed estimation block 62 provides a wheel speed estimate $v_{west}$ based on the measured wheel speed $v_{wheel}$. It is noted that the block 62 includes a switch 90 which selectively decouples the estimated wheel speed $v_{west}$ from the output of the adder 84 in the event the RESET signal is active (i.e., RESET=1). During such time, the measured wheel speed $v_{wheel}$ is provided directly as the estimated wheel speed $v_{west}$. The reset period is sufficiently long to allow the output of the integrator block 86 to converge to the measured wheel speed (e.g., approximately 100 milliseconds assuming a sampling rate of approximately 1 KHz.

Referring briefly to FIG. 6, the vehicle speed estimation block 60 has basically the same structure as the wheel speed estimation block 62. More specifically, the vehicle speed estimation block 60 includes an adder 80, limiter 82, adder 84, integrator block 86, and reset switch 90. Thus, only the differences between blocks 60 and 62 will be discussed herein. The primary difference is that the limits for the limiter 82 in block 60 are X and -X, where X represents the predetermined maximum rate of change that the vehicle can experience during one sample period under normal braking conditions (e.g., braking on a dry surface). For example, it may be predetermined that the maximum rate at which the vehicle (e.g., aircraft) can accelerate or decelerate is 0.6 g. As is known, the value of X is affected primarily by the total vehicle mass. The output of the adder 84 represents the estimated vehicle speed $v_{vest}$.

The limiter 82 in the vehicle speed estimation block 60 also includes a rate limit modifier (RLM) signal input which provides for the modification of the value of X during a braking operation. As is discussed below in association with FIG. 7, the linear control block 52 provides an RLM signal which is input to the vehicle speed estimation block 60 to modify the value of X. In the event the linear control block 52 is unable to maintain braking at approximately the desired slip velocity $s_{desired}$, for example due to wet or icy surface conditions, the value of X in the limiter 82 is reduced based on the value of RLM. For example, the value of X is set to an initial value and is decremented on each sample that the RLM signal is non-zero by the limiter 82. Likewise, the value of X is incremented by the limiter 82 on each sample that the RLM signal is zero. In the exemplary embodiment, the value of X is set to 0.018 (0.6 g at a sample rate of 1 KHz) initially. As the magnitude of the RLM signal becomes non-zero as it increases from 0 to M (as discussed below), the value of X is incrementally decremented to 0.017, 0.016, 0.015, etc. The value of X is incrementally increased towards its initial value when the RLM signal is zero. When a maintainable operating point is reached, the value of X is effectively toggled back to its initial value. In this manner, the differential controller 34 effectively seeks an operating point at which it can maintain braking at the desired slip velocity $s_{desired}$.

In another embodiment, an accelerometer (not shown) which is included for measuring the acceleration of the vehicle provides a means for modifying the value of X. More specifically, the measured acceleration is used to influence the value of X in place of the RLM signal. Alternatively, the measured acceleration can be used in place of X in the limiter 82.

In order to eliminate the effects of vehicle pitch and roll, a three-axis accelerometer could be used. Braking deceleration can be viewed as a vector that is ninety degrees from the acceleration of gravity (assuming a level braking surface). By measuring the magnitude of all three acceleration vectors (from the respective axes) and computing the absolute magnitude of the acceleration, a vector is formed that represents the total acceleration, including gravity. The vehicle deceleration can be computed by taking the square root of the total acceleration squared minus the acceleration of gravity squared. Correction factors can be added for non-level braking surfaces. The thus obtained vehicle deceleration may then be used to modify or replace the value of X in the limiter 82.

Although, for a braking event, it could be said that only the negative rate limits in the limiters 82 are necessary, the present invention uses two equally spaced rate limits placed around the inputs. The noise present in the signals has some components that are gaussian and some that have strong single frequency content. The gaussian noise will have an equal number of positive and negative excursions over a significant number of samples. Using a single ended rate limit on the signal may undesirably cause biasing errors.

Figure 7:
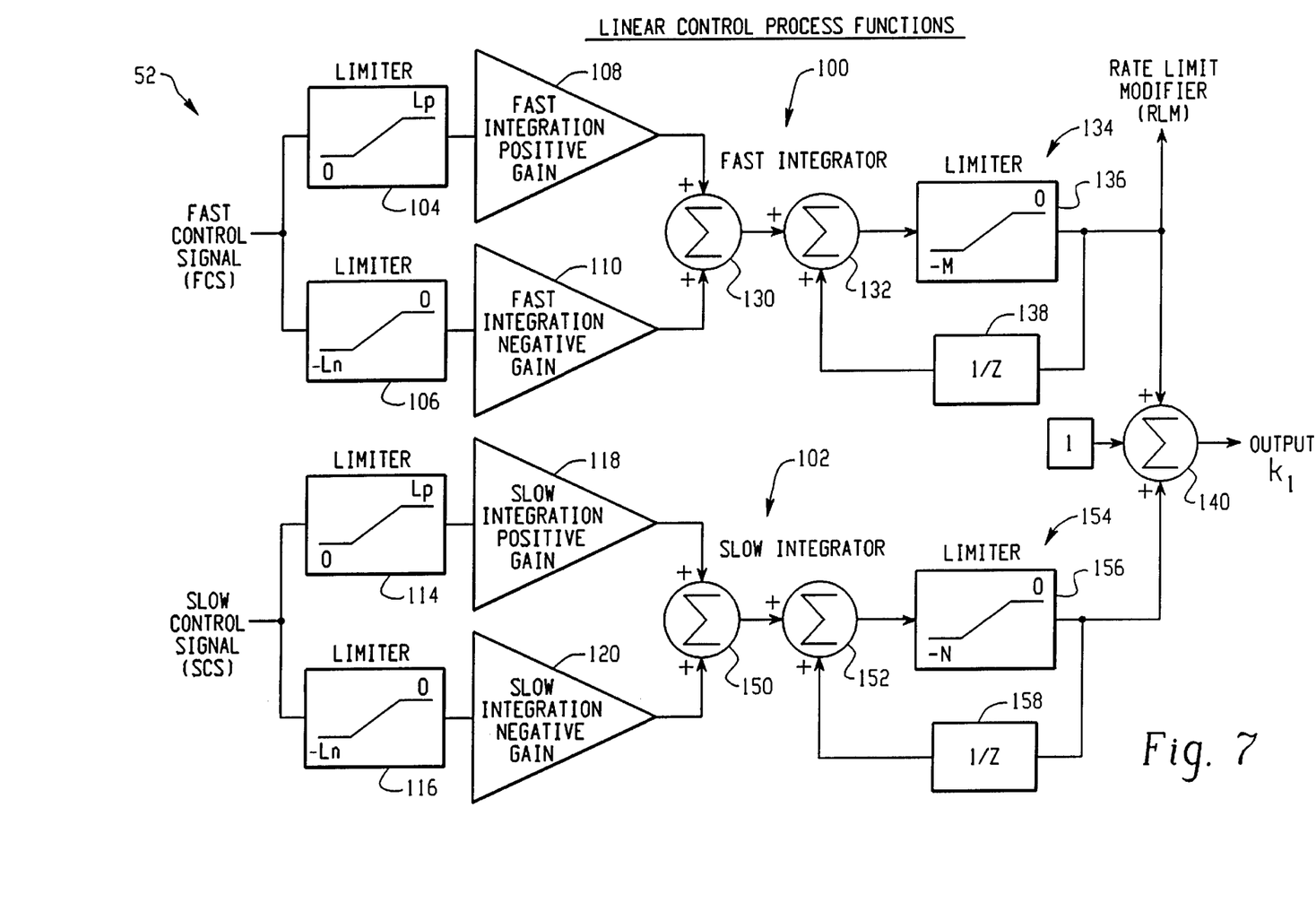
FIG. 7 is a detailed schematic diagram of the linear control process block in accordance with the present invention.

FIG. 7 illustrates the linear control block 52 in detail. As is shown, the FCS signal is input to a fast integrator 100 included in the block 52. The SCS signal is input into a slow integrator 102. Each of the control signals FCS and SCS are separated into positive and negative components and each component is limited in magnitude. Individual gains are applied to each of the components. Specifically, the FCS signal is input to a positive limiter 104 and a negative limiter 106. The output of the positive limiter 104 is limited to the range between 0 and Lp, and is input to a positive component gain amplifier 108. The output of the negative limiter 106 is limited to the range between 0 and -Ln, and is input to a negative component gain amplifier 110 as shown.

Similarly, the SCS signal is input to a positive limiter 114 and a negative limiter 116. The output of the positive limiter 114 is limited to the range between 0 and Lp, and is input to a positive component gain amplifier 118. The output of the negative limiter 116 is limited to the range between 0 and −Ln, and is input to a negative component gain amplifier 120 as shown.

The outputs of the amplifiers 108 and 110 are added together by an adder 130. The output of the adder 130 is input to another adder 132 forming part of a limited integrator 134 included in the fast integrator 100. The output of the adder 132 is input to a limiter 136 which limits the output of the adder 132 to the range between −M and 0. The output of the limiter 136 is fed back through an integrator block 138 to the other input of the adder 132.

The output of the limiter 136 represents the RLM signal which is fed back to the vehicle parameter estimation block 50 as discussed above. In addition, the output of the limiter 136 is input to an adder 140 which serves to combine the output of the fast integrator 100 with the output of the slow integrator 102. As will be appreciated, as the FCS signal remains positive the output of the limiter 136 will tend towards the value of zero. As the FCS signal goes negative, the output of the limiter 136 will tend towards a value of −M. Hence, the output of the fast integrator 100 will tend to vary between −M and 0 depending on the FCS signal (which is based on the comparison of the estimated slip velocity and the desired slip velocity as previously discussed).

Regarding the slow integrator 102, the outputs of the amplifiers 118 and 120 are added together by an adder 150. The output of the adder 150 is input to another adder 152 forming part of a limited integrator 154 included in the slow integrator 102. The output of the adder 152 is input to a limiter 156 which limits the output of the adder 154 to the range between −N and 0. The output of the limiter 156 is fed back through an integrator block 158 to the other input of the adder 152.

The output of the limiter 156 is also input to the adder 140. As will be appreciated, as the SCS signal remains positive the output of the limiter 156 will tend towards the value of zero. As the SCS signal goes negative, the output of the limiter 156 will tend towards a value of −N. Hence, the output of the fast integrator 100 will tend to vary between −N and 0 depending on the SCS signal (which also is based on the comparison of the estimated slip velocity and the desired slip velocity as previously discussed).

The adder 140 also receives as an input the value "1" which is added together with the outputs from the fast integrator 100 and the slow integrator 102. The output of the adder 140 represents the output k1 from the linear control block 52.

As will be appreciated, the combination of the magnitude limits Lp and Ln of the limiters 104, 106, 114 and 116, and the gains of the respective amplifiers 108, 110, 118 and 120 define the slew rate limits for the respective components of the control signals FCS and SCS in the fast and slow integrators. The limited integrators 134 and 154 define the authority of the particular components in the composite output signal k1.

Generally, the fast integrator 100 is configured preferably to have a gain and a slew rate limit that is faster than the response of the brake actuator 26 (FIG. 2). The fast integrator 100, however, is also set to have less authority by limiting its output to a small number (M). The slow integrator 102 is generally set to a gain and slew rate limit that is slower than the response of the brake actuator 26. It has the greatest authority in the composite output signal k1 as determined by N (where N>M). The use of the two integrators 100 and 102 that bound the response performance of the actuator 26 makes the present invention less sensitive to varying actuator characteristics.

For control over the entire range of output conditions, M+N=1, or 100% of the range is considered. Thus, the composite output signal k1 may vary anywhere from between 0 and 1. While operating on dry surfaces, only the slow integrator 102 will usually be active. If the braking surface has a low coefficient of friction (e.g., due to icy or wet conditions), the fast integrator 100 will begin to add to the composite output k1. In addition, the output of the fast integrator 100 is fed back to the vehicle parameter estimation block 50 as the RLM signal as discussed above.

In another embodiment, it may be useful to vary the authority of the fast integrator 100 and the slow integrator 102 during a braking event. The fast integrator 100 generally requires less authority at lower velocities. An additional limit modifier can be added to the linear control block 52 that reduces M and increases N in the limiters 136 and 156, respectively, in proportion to the measured wheel speed $v_{wheel}$. The relationship M+N=1 should be maintained, however, while varying controller authority.

Figure 8:
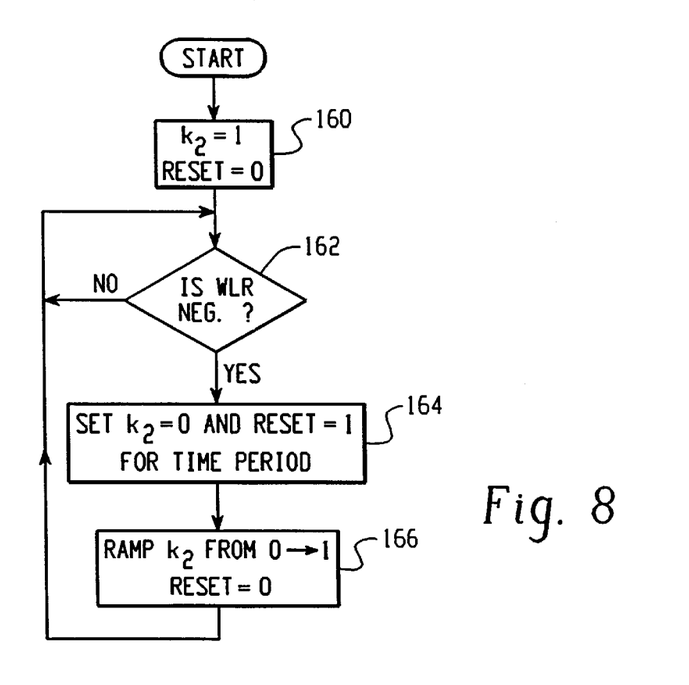
FIG. 8 is a flow chart representing the operation of the skid protection block in accordance with the present invention.

Turning now to FIG. 8, a flow chart is provided representing the process carried out by the skid protection block 54 in accordance with the exemplary embodiment. Upon initialization of the controller 34, the skid protection block 54 sets its output signal k2 equal to 1 as represented in step 160. Also in step 160, the skid protection block 54 sets its output signal RESET equal to 0. Next, in step 162 the skid protection block 54 determines if the WLR signal has gone negative as input from the vehicle parameter estimation block 50. If not, indicating the estimated slip velocity $s_{est}$ is not greater than the maximum $s_{max}$, the skid protection block 54 continues to loop through step 162.

If the WLR signal does go negative as determined in step 162, the process proceeds to step 164 in which the skid protection block 54 sets the values of the output signal k2 equal to 0 and the RESET signal equal to one for a predetermined time period as discussed above. Thereafter, the skid protection block 54 proceeds to step 166 in which it gradually ramps the value of the output signal k2 from 0 back to 1. In addition, the RESET signal is set back to 0. Operation then returns to step 162 as shown.

By setting the value of k2 equal to zero in step 164, the skid protection block 54 causes the composite control signal k output by the multiplier 56 (FIG. 3) to go to zero. Thus, the output $T_{output}'$ to the brake actuator 26 goes to zero causing the brakes to be released for the period established in step 164. The RESET signal set equal to 1 in step 164 allows the vehicle parameter estimator block 50 to reset itself as previously described. As the value of k2 is gradually increased in step 166 with the RESET signal set back to 0, the actuator 26 will be reactivated as will be appreciated.

The skid protection block 54 may be implemented via software control of a microprocessor, or may be carried out using discrete components. Those having ordinary skill in the art will be able to make such an operational component based the description provided herein. Hence, additional detail is omitted.

In the above-described embodiment, the outputs k1 and k2 from the linear control block 52 and the skid protection block 54, respectively, are scaled from zero to one. These outputs k1 and k2 are multiplied to form the composite control signal k, also in the range of zero to one. In brake control applications where the controller 34 has access to the brake command $T_{output}$, the composite signal k is multiplied by the brake command $T_{output}$ to produce the modified $T_{output}'$. In purely antiskid applications, where the brake command is not accessible, the composite signal k may be used to control an antiskid valve (not shown). In such case, the composite signal k must be scaled to match the electrical characteristics of the valve actuator unit for driving the antiskid valve.

The differential reference controller 34 in accordance with the present invention is particularly suited for use where the wheel speed is the only source of information available to the controller. An option is presented, as discussed above, to utilize an accelerometer.

The differential controller 34 as described above is made up primarily of discrete components including linear controllers and the like for ease of understanding. However, it will be appreciated that much of the processes described herein can be carried out via a programmed microcontroller, microprocessor, digital signal processor, etc. Hence, the invention is not intended to be limited to any particular construction as will be appreciated.

Although the invention has been shown and described with respect to certain preferred embodiments, it is obvious that equivalents and modifications will occur to others skilled in the art upon the reading and understanding of the specification. For example, the exemplary embodiment utilizes a fast integrator and a slow integrator configured to contribute beginning at corresponding points. However, additional integrator loops could be used to provide further flexibility as will be appreciated. The present invention includes all such equivalents and modifications, and is limited only by the scope of the following claims.

What is claimed is:

1. A system for controlling a braking force applied to a wheel of a vehicle, comprising:
   a brake controller having an input for receiving a brake force command indicative of a desired amount of brake force to be applied to the wheel, and an output for providing a brake force output command to a brake actuator and assembly which applies a brake force to the wheel based on the brake force output command;
   a wheel speed sensor, operatively coupled to the wheel, for measuring a speed of the wheel and providing an output signal indicative of the measured wheel speed; and
   a differential reference controller, comprising:
      means for estimating the wheel speed based on the output signal of the wheel speed sensor;
      means for estimating the vehicle speed based on the output signal of the wheel speed sensor;
      means for calculating a difference between the estimated vehicle speed and the estimated wheel speed to obtain an estimated slip velocity; and
      means for adjusting the brake force applied to the wheel by the brake controller based on the estimated slip velocity.

2. The system of claim 1, wherein the means for estimating wheel speed and the means for estimating vehicle speed carry out substantially identical processing functions, and the means for calculating a difference results in wheel speed noise which is introduced into the means for estimating wheel speed and the means for estimating vehicle speed via the output signal being canceled.

3. The system of claim 1, wherein the means for estimating wheel speed and the means for estimating vehicle speed each include a respective rate limiter.

4. The system of claim 3, wherein the rate limiter included in the means for estimating wheel speed includes a limiter with a predefined wheel rate limit based on a predetermined maximum rate of change which can occur in the wheel speed during a sample period.

5. The system of claim 3, wherein the rate limiter included in the means for estimating vehicle speed includes a limiter with a predefined vehicle rate limit based on a predetermined maximum rate of change which can occur in the vehicle speed during a sample period.

6. The system of claim 5, wherein the predefined vehicle rate limit is modified based on the slip velocity.

7. The system of claim 1, wherein the means for adjusting the brake force comprises a plurality of control loops which receive the estimated slip velocity as an input, each of the plurality of control loops having a different slew rate for providing operation at a predefined desired slip velocity.

8. The system of claim 7, wherein a contribution of each of the plurality of control loops in modifying the brake force output command varies as a function of the estimated slip velocity.

9. A differential reference controller for controlling braking operation of a wheel of a vehicle based on an output signal provided by a wheel speed sensor coupled to the wheel, the controller comprising:
   means for estimating the wheel speed based on the output signal of the wheel speed sensor;
   means for estimating the vehicle speed based on the output signal of the wheel speed sensor;
   means for calculating a difference between the estimated vehicle speed and the estimated wheel speed to obtain an estimated slip velocity; and
   output means for providing a control signal for adjusting the brake force applied to the wheel based on the estimated slip velocity.

10. The system of claim 9, wherein the means for estimating wheel speed and the means for estimating vehicle speed carry out substantially identical processing functions, and the means for calculating a difference results in wheel speed noise which is introduced into the means for estimating wheel speed and the means for estimating vehicle speed via the output signal being canceled.

11. The system of claim 9, wherein the means for estimating wheel speed and the means for estimating vehicle speed each include a respective rate limiter.

12. The system of claim 11, wherein the rate limiter included in the means for estimating wheel speed includes a limiter with a predefined wheel rate limit based on a predetermined maximum rate of change which can occur in the wheel speed during a sample period.

13. The system of claim 11, wherein the rate limiter included in the means for estimating vehicle speed includes a limiter with predefined vehicle rate limit based on a predetermined maximum rate of change which can occur in the vehicle speed during a sample period.

14. The system of claim 13, wherein the predefined vehicle rate limit is modified based on the slip velocity.

15. A method for controlling a braking force applied to a wheel of a vehicle, the method comprising the steps of:
   receiving a brake force command indicative of a desired amount of brake force to be applied to the wheel, and providing a brake force output command to a brake actuator and assembly which applies a brake force to the wheel based on the brake force output command;
   measuring a speed of the wheel and providing an output signal indicative of the measured wheel speed;
   estimating the wheel speed based on the output signal of the wheel speed sensor;
   estimating the vehicle speed based on the output signal of the wheel speed sensor;
   calculating a difference between the estimated vehicle speed and the estimated wheel speed to obtain an estimated slip velocity; and adjusting the brake force applied to the wheel based on the estimated slip velocity.

16. The method of claim 15, wherein the steps of estimating the wheel speed and the vehicle speed involve substantially identical processing functions, and the step of calculating of the difference results in wheel speed noise which is introduced in the steps of estimating the wheel speed and the vehicle speed via the output signal being canceled.

17. The method of claim 15, wherein the steps of estimating wheel speed and estimating vehicle speed each include a performing a respective rate limiter.

18. The method of claim 17, wherein the rate limiter included in the step of estimating wheel speed includes using a limiter with a predefined wheel rate limit based on a predetermined maximum rate of change which can occur in the wheel speed during a sample period.

19. The method of claim 17, wherein the rate limiter included in the step of estimating vehicle speed includes using a limiter with a predefined vehicle rate limit based on a predetermined maximum rate of change which can occur in the vehicle speed during a sample period.

20. The method of claim 19, wherein the predefined vehicle rate limit is modified based on the slip velocity.

21. The method of claim 15, wherein the step of adjusting the brake force comprises using a plurality of control loops which receive the estimated slip velocity as an input, each of the plurality of control loops having a different slew rate for providing brake operation at a predefined desired slip velocity.

22. The method of claim 21, wherein a contribution of each of the plurality of control loops in modifying the brake force output command varies as a function of the estimated slip velocity.

* * * * *